(12) United States Patent
Oughton, Jr.

(10) Patent No.: US 6,933,626 B2
(45) Date of Patent: Aug. 23, 2005

(54) FERROELECTRIC TRANSFORMER-FREE UNINTERRUPTIBLE POWER SUPPLY (UPS) SYSTEMS AND METHODS FOR COMMUNICATIONS SIGNAL DISTRIBUTION SYSTEMS

(75) Inventor: George W. Oughton, Jr., Raleigh, NC (US)

(73) Assignee: Alphatec Ltd., Limassol (CY)

( * ) Notice: Subject to any disclaimer, the term of this patent is extended or adjusted under 35 U.S.C. 154(b) by 550 days.

(21) Appl. No.: 09/906,293

(22) Filed: Jul. 16, 2001

(65) Prior Publication Data

US 2002/0153778 A1 Oct. 24, 2002

Related U.S. Application Data

(60) Provisional application No. 60/286,178, filed on Apr. 24, 2001.

(51) Int. Cl.[7] .................................................. H02J 7/00
(52) U.S. Cl. ............................. 307/64; 307/66; 363/86
(58) Field of Search ........................ 307/64, 66; 363/86

(56) References Cited

U.S. PATENT DOCUMENTS

| | | | |
|---|---|---|---|
| 3,860,748 A | 1/1975 | Everhart et al. ................ | 178/6 |
| 3,909,560 A | 9/1975 | Martin et al. ............. | 170/170 J |
| 3,916,295 A | 10/1975 | Kennedy ................... | 323/22 T |

(Continued)

OTHER PUBLICATIONS

Multipower, Inc., http://www.multipowerups.com/news/voli.htm, Confluence Newsletters, MP, 900, MP 1350.
Spears, *Disturbances Can Toast Your System*, Reprint from Communications Technology, Apr. 2000, 4 pp.
*Broadband Business and News Perspective*, Reprinted from CED, Apr. 2000, 4 pp.
Invensys, *Sometimes Less is More*, Publication No. CSG28FXA 2/00.
Invensys, *Power When You Really Need It*, Publication No. CSG29FXA 2/00.
Bridge et al., *Preventing Outages Without Batteries*, CED, Jun. 1999, 7 pp.
LecTro Products Incorporated, *CATV Power Solutions*, Publication No. CSG24FYA, Jun. 1999.
Marcotte, *Power Migration Strategies for Future–Proofing*, Reprinted from CED Magazine, Jun. 1997, 3 pp.
Lectro Products Incorporated, *Lectro Ferro Family*, Publication No. CSG16FXA, Nov. 1998.
Marcotte et al., *Powering Cable TV Systems*, Reprinted from Broadband Systems & Design, Jun. 1996, 4 pp.

*Primary Examiner*—Robert L. DeBeradinis
(74) *Attorney, Agent, or Firm*—Michael R. Schacht; Schacht Law Office, Inc.

(57) ABSTRACT

Uninterruptible Power Supply (UPS) systems and methods for a communications signal distribution system, such as a cable television (CATV) signal distribution system that distributes a communication signal and an Alternating Current (AC) power over a coaxial cable having a conductor and a sheath, include an input neutral line and an input voltage line. A first circuit is configured to convert an input voltage between the input neutral line and the input voltage line into first and second complementary Direct Current (DC) voltages. A second circuit is configured to convert the first and second complementary DC voltages into an AC voltage between an output neutral line and an output voltage line, and to connect the output neutral line to a coaxial cable sheath and the output voltage line to a coaxial cable conductor. The first and second circuits are configured to connect the input neutral line to the output neutral line without an intervening transformer winding.

36 Claims, 10 Drawing Sheets

U.S. PATENT DOCUMENTS

| | | |
|---|---|---|
| 4,004,110 A | 1/1977 | Whyte .................... 179/170 J |
| 4,724,478 A | 2/1988 | Masuko et al. ............... 358/86 |
| 4,943,763 A | 7/1990 | Bobry |
| 4,975,649 A | 12/1990 | Bobry |
| 5,010,469 A | 4/1991 | Bobry |
| 5,029,285 A | 7/1991 | Bobry |
| 5,302,858 A | 4/1994 | Folts |
| 5,400,005 A | 3/1995 | Bobry |
| 5,410,720 A | 4/1995 | Osterman |
| 5,457,377 A | 10/1995 | Jonsson |
| 5,532,525 A | 7/1996 | Kaiser et al. |
| 5,638,244 A | 6/1997 | Mekanik et al. |
| 5,642,002 A | 6/1997 | Mekanik et al. |
| 5,739,595 A | 4/1998 | Mekanik et al. ............... 307/64 |
| 5,747,888 A | 5/1998 | Zilberberg .................. 307/66 |
| 5,760,495 A | 6/1998 | Mekanik |
| 5,892,431 A | 4/1999 | Osterman |
| 5,961,604 A | 10/1999 | Anderson et al. |
| 5,994,793 A | 11/1999 | Bobry ........................ 307/64 |
| 6,014,015 A | 1/2000 | Thorne et al. |
| 6,069,412 A * | 5/2000 | Raddi et al. .................. 307/66 |
| 6,288,916 B1 | 9/2001 | Liu et al. |
| 6,348,782 B1 | 2/2002 | Oughton, Jr. et al. |
| 6,486,399 B1 | 11/2002 | Armstrong et al. |
| 6,602,627 B2 | 8/2003 | Liu et al. |

* cited by examiner

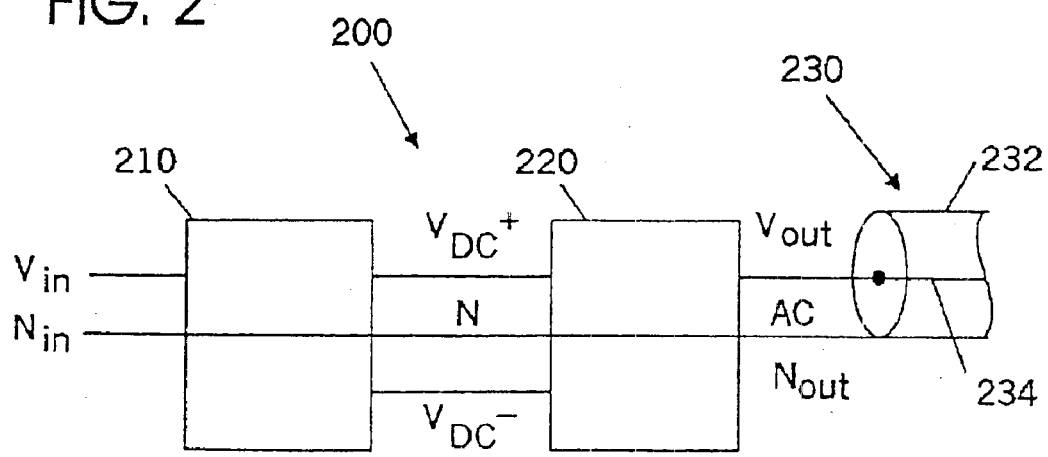
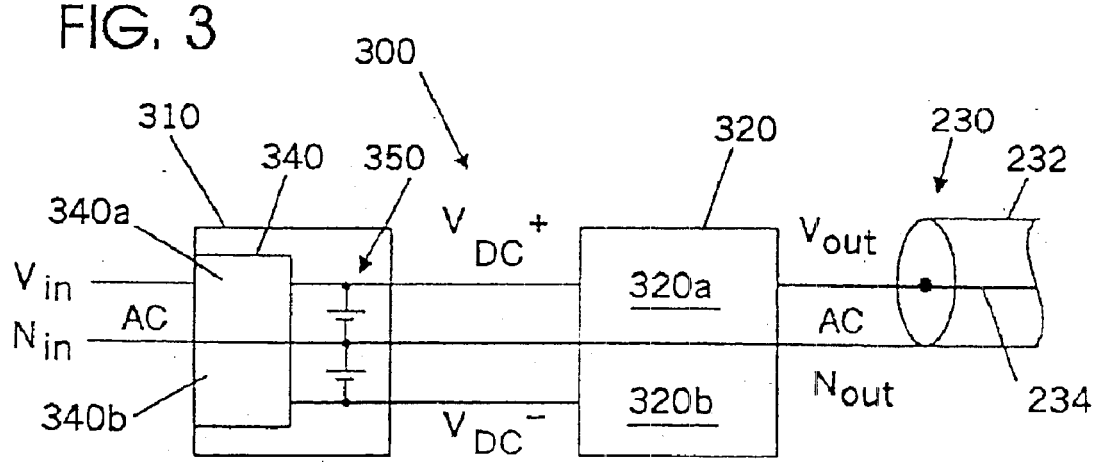
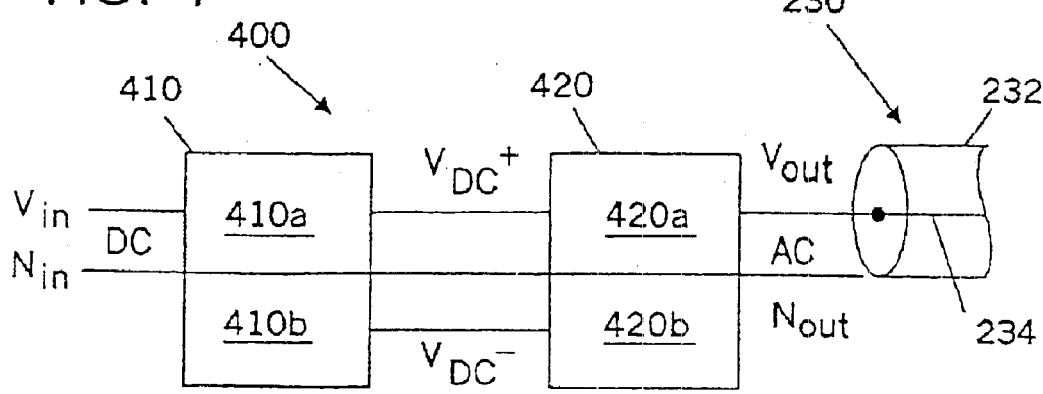

FERROELECTRIC TRANSFORMER-FREE UNINTERRUPTIBLE POWER SUPPLY (UPS) SYSTEMS AND METHODS FOR COMMUNICATIONS SIGNAL DISTRIBUTION SYSTEMS

CROSS REFERENCE TO RELATED APPLICATION

This application claims the benefit of Provisional Application Ser. No. 60/286,178, Filed Apr. 24, 2001, entitled *Ferroelectric Transformer-Free Uninterruptible Power Supply (UPS) Systems and Methods for Communications Signal Distribution Systems*, the disclosure of which is hereby incorporated herein by reference in its entirety.

FIELD OF THE INVENTION

This invention relates to Uninterruptible Power Supply (UPS) systems and methods, and more particularly to UPS systems and methods for communications signal distribution systems such as cable television (CATV) signal distribution systems.

BACKGROUND OF THE INVENTION

Communications signal distribution systems and methods are widely used to distribute a communications signal from at least one communications signal operator to at least one subscriber. For example, cable television (CATV) communications signal distribution systems and methods distribute CATV signals from CATV operators to CATV subscribers. These CATV communications signal distribution systems and methods generally employ a large number of line amplifiers that amplify the communications signal. These systems and methods also generally distribute Alternating Current (AC) power and a communications signal over a coaxial cable having a conductor and a sheath.

In order to reduce the effects of power surges, high voltage spikes, switching transients, power sags, electrical line noise, frequency variations, brown-outs, power failure and/or harmonic distortion on the delivery of the communications signal, it is generally desirable to provide Uninterruptible Power Supply (UPS) systems and methods for the line amplifiers of the communications signal distribution system. These UPS systems and methods may traditionally employ a ferroresonant transformer. See, for example, the brochure entitle *CATV Power Solutions*, published by Lec-Tro Products Incorporated, Publication No. CSG24FYA, June 1999, and the brochure entitled *Lectro Ferro Family*, published by LecTro Products Inc., Publication No. CSG16FXA, November 1998.

FIG. 1 is a schematic diagram of a conventional UPS for a communications signal distribution system, that includes a ferroresonant transformer. As shown, the UPS 100 includes a ferroresonant transformer 110, a first primary winding 112 of which is connected between an AC input line 142 and a neutral input line 144 via a utility service entrance box 140, and a resonant secondary winding 116 of which is connected to a coaxial cable 130 having an inner conductor 134 and a sheath 132. A second primary winding 114 of the ferroresonant transformer 110 is connected to a battery 120 via an inverter 122 to provide a "standby" UPS, wherein a transfer switch 150 is used to detect loss of the line voltage input between the input lines 142 and 144, to switch off power to the first primary winding 112 of the ferroresonant transformer and to activate the inverter 122 to power the second primary winding 114 of the ferroresonant transformer.

Still referring to FIG. 1, it can be seen that the input neutral line 144 may be grounded by a pole ground rod, a service ground rod and/or a box ground, and the neutral output line that is connected to the coaxial cable sheath 132 may be grounded by a chassis ground, a cabinet earth ground rod and/or a coaxial sheath ground. The primary and secondary ferroresonant transformer windings 112 and 116, respectively, are interposed between the AC input line 142 and the input neutral line 144, and an output voltage line and an output neutral line 136 that is connected to the sheath 132 of the coaxial cable 130.

Other UPSs for CATV systems are described in U.S. Pat. No. 3,860,748 to Everhart et al. entitled *CATV Primary and Auxiliary Power Distribution Apparatus*; U.S. Pat. No. 3,909,560 to Martin et al. entitled *Method and System for Providing Power to Booster Amplifiers in HF. Cable Network*; U.S. Pat. No. 3,916,294 to Kennedy entitled *Cable Television Substation Regulated Power Supply With Ripple Suppression*; U.S. Pat. No. 4,004,110 to Whyte entitled *Power Supply for Power Line Carrier Communication Systems*; U.S. Pat. No. 4,724,478 to Masuko et al. entitled *Cable Television Communication System With Passive Sensor Signal Path and a Subscriber Power Supply Source*; U.S. Pat. No. 5,739,595 to Mekanik et al. entitled *Apparatus and Methods for Generating an AC Power Signal for Cable TV Distribution Systems*; U.S. Pat. No. 5,747,888 to Zilberberg entitled *Back Up System for the Supply of Voltage in Television Cable Systems*; and U.S. Pat. No. 5,994,793 to Bobry entitled *Uninterruptible Power Supply With Plurality of invertors*. Other publications describing UPSs for CATV systems may be found at the website www.multipowerups.com and in a publication entitled *Preventing Outages Without Batteries* by Bridge et al., CED, June 1999.

Communications signal distribution systems such as CATV systems may be increasingly called upon to distribute Internet, data, telephony and/or advanced video signals. Accordingly, the performance demands for UPS systems and methods for communications signal distribution systems may continue to increase.

SUMMARY OF THE INVENTION

Embodiments of the invention provide Uninterruptible Power Supply (UPS) systems and methods for a communications signal distribution system, such as a cable television (CATV) signal distribution system, that distributes a communication signal and Alternating Current (AC) power over a coaxial cable having a conductor and a sheath. An input neutral line and an input voltage line are provided. A first circuit is configured to convert an input voltage between the input neutral line and the input voltage line into first and second complementary Direct Current (DC) voltages. A second circuit is configured to convert the first and second complementary DC voltages into an AC voltage between an output neutral line and an output voltage line, and to connect the output neutral line to a coaxial cable sheath and the output voltage line to a coaxial cable conductor. The first and second circuits are configured to connect the input neutral line to the output neutral line without an intervening transformer winding.

In some embodiments, the input voltage is an AC input voltage between the input neutral line and the input voltage line. The first circuit comprises a battery and a third circuit that is configured to convert the AC input voltage between the input neutral line and the input voltage line into the first and second complementary DC voltages, and to supply the first and second complementary DC voltages to the battery.

The second circuit is configured to convert the first and second complementary DC voltages from the battery into the AC voltage between an output neutral line and an output voltage line.

In some embodiments, the third circuit comprises a rectifier such as a buck rectifier. In other embodiments, the third circuit comprises a first portion that is connected between the input neutral line and the first complementary DC voltage, and a second portion that is a mirror image of the first portion and that is connected between the input neutral line and the second complementary DC voltage. In other embodiments, the second circuit comprises a first portion that is connected between the output neutral line and the first complementary DC voltage, and a second portion that is a mirror image of the first portion and that is connected between the output neutral line and the second complementary DC voltage.

In yet other embodiments, the second circuit comprises a DC-to-DC converter that is configured to convert the first and second complementary DC voltages into third and fourth complementary DC voltages, and an inverter that is responsive to the third and fourth complementary DC voltages and is configured to convert the third and fourth complementary DC voltages into the AC voltage between an output neutral line and an output voltage line. In some embodiments, the DC-to-DC converter is a boost converter and the inverter is a pulse width modulation inverter.

In still other embodiments, the input voltage is a DC input voltage between the input neutral line and the input voltage line, such as may be supplied by a telecommunications plant. A first circuit is configured to convert the DC input voltage between the input neutral line and the input voltage line into first and second complementary DC voltages. In some embodiments, the first circuit may comprise a battery polarity shifter. In other embodiments, the first circuit may comprise a first portion that is connected between the input neutral line and the first complementary DC voltage and a second portion that is a mirror image of the first portion and that is connected between the input neutral line and the second complementary DC voltage.

In still other embodiments, the second circuit comprises a first portion that is connected between the output neutral line and the first complementary DC voltage and a second portion that is a mirror image of the first portion and that is connected between the output neutral line and the second complementary DC voltage.

In other embodiments, the second circuit is configured to convert the first and second complementary DC voltages into the AC voltage between an output neutral line and an output voltage line, regardless of whether the AC voltage is operational. Accordingly, "on-line" UPS systems and methods may be provided that can reduce and preferably can eliminate transfer time from the AC input voltage to the battery.

In yet other embodiments of the invention, the second circuit is configured to convert the first and second complementary DC voltages into the AC voltage between the output neutral line and the output voltage line, wherein the AC voltage has a trapezoidal waveform. A trapezoidal power waveform can improve the performance of the communications signal distribution system.

Moreover, in still other embodiments, the second circuit is configured to convert the first and second complementary DC voltages into an AC voltage between the output neutral line and the output voltage line, wherein the AC voltage has an AC frequency that is greater than 60 Hz. By providing an AC frequency that is greater than 60 Hz, these embodiments can reduce the impact of sheath voltages and/or currents on the performance of the communications signal distribution system.

Other embodiments of the invention can provide UPS systems and methods for a communications signal distribution system that distributes a communications signal and AC power over a coaxial cable. A first circuit is responsive to an AC input voltage and is configured to convert the AC input voltage into a DC voltage. A battery produces a battery voltage and is configured to be charged by the DC voltage. A second circuit is responsive to the battery voltage and is configured to convert the battery voltage into an AC voltage and to place the AC voltage on the coaxial cable regardless of whether the AC input voltage is operational. Thus, on-line UPS systems and methods may be provided.

In some embodiments, the first circuit comprises a rectifier such as a buck rectifier and the second circuit comprises a converter such as a boost converter and an inverter such as a pulse width modulation inverter. In other embodiments, both the first and second circuits may include a first portion and a second portion that is a mirror image of the first portion. Other embodiments connect the input neutral line to the output neutral line without an intervening transformer winding, produce a trapezoidal waveform and/or produce an AC output frequency that is greater than 60 Hz.

Other embodiments of UPS systems and methods for communications signal distribution systems that distribute a communications signal and AC power over a coaxial cable include a first circuit that is responsive to a DC input voltage and is configured to convert the DC input voltage into first and second complementary DC voltages. A second circuit is responsive to the first and second complementary DC voltages and is configured to convert the first and second complementary DC voltages into an AC voltage and to place the AC voltage on a coaxial cable. In some embodiments, the first circuit may comprise a polarity shifter. The second circuit may comprise a converter such as a boost converter and an inverter such as a pulse width modulation inverter. Mirror image first and second circuits, no intervening transformer windings, trapezoidal waveforms and/or output frequencies greater than 60 Hz also may be provided as was described above.

It will be understood that although embodiments of the invention have been described above primarily for UPS systems, analogous UPS methods also may be provided.

BRIEF DESCRIPTION OF THE DRAWINGS

FIGS. 2–6 are block diagrams of UPS systems and methods according to embodiments of the invention.

DETAILED DESCRIPTION OF PREFERRED EMBODIMENTS

Figure 1:
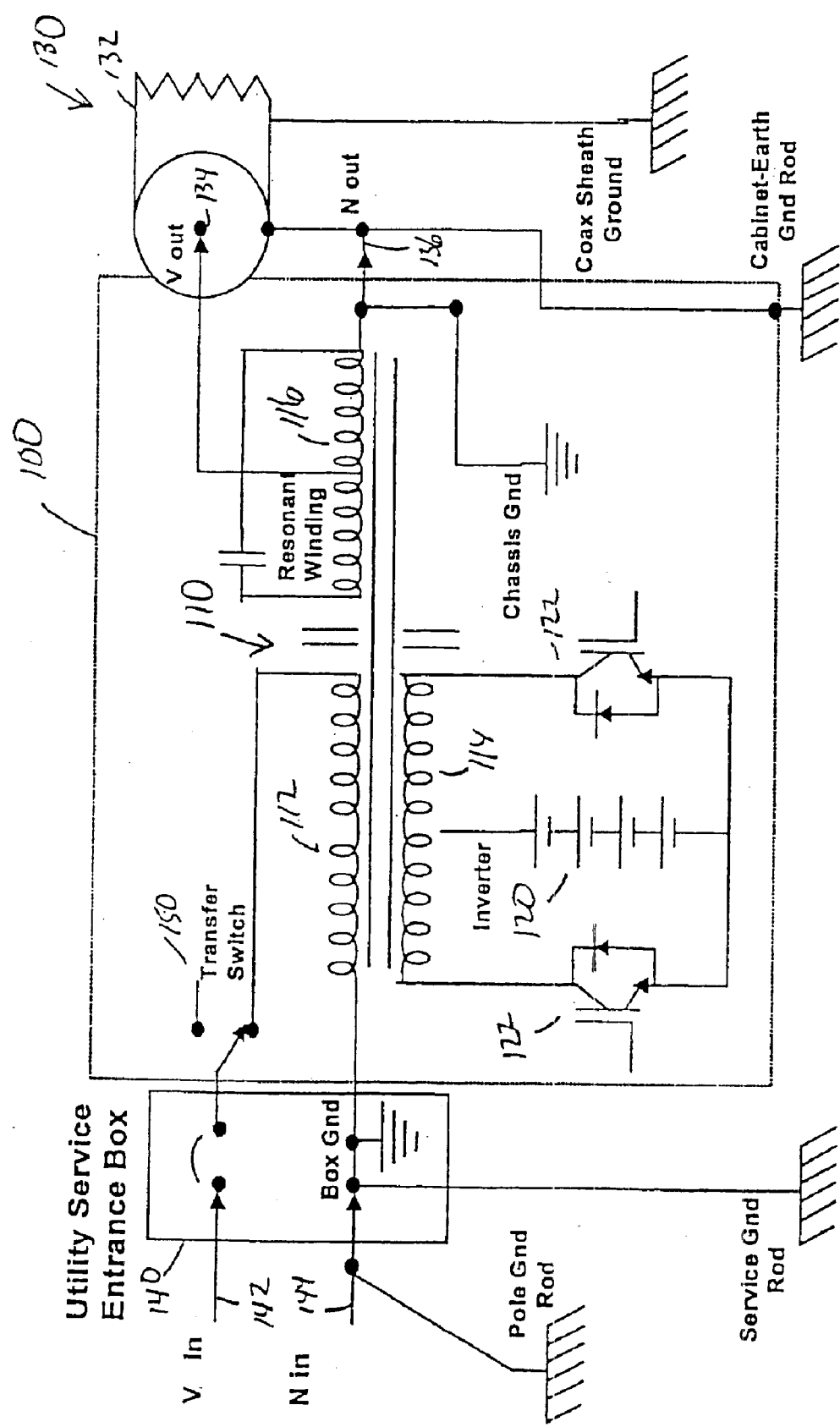
FIG. 1 is a schematic diagram of a conventional UPS for a communications signal distribution system, that includes a ferroresonant transformer.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 2 is a block diagram of UPS systems and methods that distribute a communications signal and AC power over a coaxial cable 230 having a conductor 234 and a sheath 232, according to embodiments of the invention. As shown in FIG. 2, these embodiments of UPS systems and methods 200 include an input neutral line $N_{in}$ and an input voltage line $V_{in}$. A first circuit 210 is configured to convert an input voltage between the input neutral line $N_{in}$ and the input voltage line $V_{in}$ into first and second complementary DC voltages $V_{DC}^+$, $V_{DC}^-$. A second circuit 220 is configured to convert the first and second complementary voltages $V_{DC}^+$, $V_{DC}^-$ into an AC voltage between an output neutral line $N_{out}$ and an output voltage line $V_{out}$, and to connect the output neutral line $N_{out}$ to a coaxial cable sheath 232 and the output voltage line $V_{out}$ to a coaxial cable conductor 234. Finally, as shown in FIG. 2, the first and second circuits 210 and 220 also are configured to connect the input neutral line $N_{in}$ to the output neutral line $N_{out}$ without an intervening transformer winding. Accordingly, in embodiments of FIG. 2, a ferroresonant transformer need not be provided. Stated differently, an electrical conductor is provided whose electrical continuity is maintained from the input neutral line $N_{in}$ to the output neutral line $N_{out}$ without any isolation device being disposed therebetween. Other UPSs which can maintain electrical continuity of a neutral line are described in U.S. Pat. No. 4,935,861 to Johnson, Jr., Raddi and the present inventor, entitled *Uninterrupted Power Supply Having No Low Frequency Power Magnetics*, the disclosure of which is hereby incorporated herein by reference.

Notwithstanding their widespread use, conventional ferroresonant transformer based UPSs for CATV system may have disadvantages. For example, they may consume excessive input current. Moreover, the ferroresonant transformer may be incompatible with many input voltage generators, the frequency of which may vary. They also may be susceptible to line surges. It also may be difficult to properly detect line loss when ferroresonant transformers are used in a standby UPS. In particular, if the line loss is detected too quickly, then nuisance transfers may be provided, which can cause "battered battery syndrome". On the other hand, if line loss is detected too slowly, then disturbances of the output signal may be provided. Finally, ferroresonant transformers may be relatively high in weight and/or cost, and/or may have degraded efficiency at reduced loads. By not requiring a ferroresonant transformer, embodiments of FIG. 2 can reduce or eliminate some or all of these disadvantages.

FIG. 3 is a block diagram of other UPS systems and methods 300 for a communications signal distribution system, according to embodiments of the invention. As shown in FIG. 3, the input voltage is an AC input voltage between the input neutral line $N_{in}$ and the input voltage line $V_{in}$. A first circuit 310 comprises a battery 350 and a third circuit 340 that is configured to convert the AC input voltage between the input neutral line $N_{in}$ and the input voltage line $V_{in}$ into the first and second complementary DC voltages $V_{DC}^+$, $V_{DC}^-$ and to supply the first and second complementary DC voltages to the battery 350. A second circuit 320 is configured to convert the first and second complementary DC voltages from the battery 350 into the AC voltage between the output neutral line $N_{out}$ and the output voltage line $V_{out}$.

In some embodiments that will be described in detail below, the third circuit 340 may comprise a rectifier such as a buck rectifier. Moreover, in other embodiments that will be described in detail below, the third circuit 340 comprises a first portion 340a that is connected between the input neutral line $N_{in}$ and the first complementary DC voltage $V_{DC}^+$ and a second portion 340b that is a mirror image of the first portion 340a and that is connected between the input neutral line $N_{in}$ and the second complementary DC voltage $V_{DC}^-$.

In yet other embodiments that also will be described in detail below, the second circuit 320 comprises a first portion 320a that is connected between the output neutral line $N_{out}$ and the first complementary DC voltage $V_{DC}^+$ and a second portion 320b that is a mirror image of the first portion 320a and that is connected between the output neutral line $N_{out}$ and the second complementary DC voltage $V_{DC}^-$. In some embodiments, the second circuit 320 may comprise a DC-to-DC converter that is configured to convert the first and second complementary DC voltages $V_{DC}^+$, $V_{DC}^-$ into third and fourth complementary DC voltages, and an inverter that is responsive to the third and fourth complementary voltages and is configured to convert the third and fourth complementary DC voltages into the AC voltage between the output neutral line $N_{out}$ and the output voltage line $V_{out}$. The DC converter may be a boost converter, and the inverter may be a pulse width modulation inverter.

FIG. 4 is a block diagram of other UPS systems and methods for communications signal distribution systems, according to embodiments of the invention. As shown in FIG. 4, these embodiments of UPS systems and methods 400 operate on a DC input voltage between the input neutral line $N_{in}$ and the input voltage line $V_{in}$. A first circuit 410 is configured to convert the DC input voltage between the input neutral line $N_{in}$ and the input voltage line $V_{in}$ into the first and second complementary DC voltages $V_{DC}^+$, $V_{DC}^-$. A second circuit 420 is configured to convert the first and second complementary DC voltages $V_{DC}^+$, $V_{DC}^-$, into an AC voltage between the output neutral line $N_{out}$ and the output voltage line $V_{out}$, and to connect the output neutral line to the coaxial cable sheath 232 and the output voltage line to the coaxial cable conductor 234. Embodiments of FIG. 4 may be used, for example, in a telecommunications plant where, for example, −48V is available from batteries in the telecommunications plant.

In some embodiments that will be described in detail below, the first circuit 410 may comprise a battery polarity shifter. The second circuit 420 may comprise a DC-to-DC converter and an inverter, as was described in connection with Block 320. Moreover, in other embodiments that will be described in detail below, the first circuit may comprise mirror image first and second portions 410a, 410b as was described in connection with the first and second portions 340a and 340b of FIG. 3. The second circuit 420 also may comprise a first portion 420a and a second portion 420b that is a mirror image of the first portion, as was described in connection with the first and second portions 320a and 320b of FIG. 3.

Additional aspects of FIGS. 2–4 now will be described. In particular, in embodiments of FIGS. 2 and 3, the second circuits 220 and 320 may be configured to convert the first and second complementary DC voltages $V_{DC}^+$, $V_{DC}^-$ into the AC voltage between the output neutral line $N_{out}$ and the output voltage line $V_{out}$, regardless of whether the AC input voltage is operational. Thus, an on-line UPS may be provided. An on-line UPS also may be provided in embodiments of FIG. 4, for example, if a battery is included as part of the first circuit 410 similar to the battery 350 of FIG. 3.

Moreover, in embodiments of FIGS. 2–4, the second circuits 220, 320 and 420 may be configured to convert the first and second complementary DC voltages $V_{DC}^+$, $V_{DC}^-$ into the AC voltage, wherein the AC voltage has a trapezoidal waveform. A trapezoidal waveform may provide an improved power waveform for communications signal distribution system amplifiers, as will be described in detail below.

Finally, embodiments of FIGS. 2–4 also may provide an AC output frequency that is greater than 60 Hz, regardless of whether a 50 or 60 Hz AC input voltage or a DC input voltage is provided. By providing an AC output voltage of frequency that is greater than 60 Hz, improved immunity to sheath voltages/currents may be provided, as will be described in detail below. In some embodiments, the AC output voltage has a frequency of about 100 Hz. In other embodiments, the AC output voltage has a frequency of about 120 Hz. Other frequencies, such as between about 80 Hz and about 140 Hz, may be used, to allow improved immunity to sheath voltages/currents.

Figure 5:
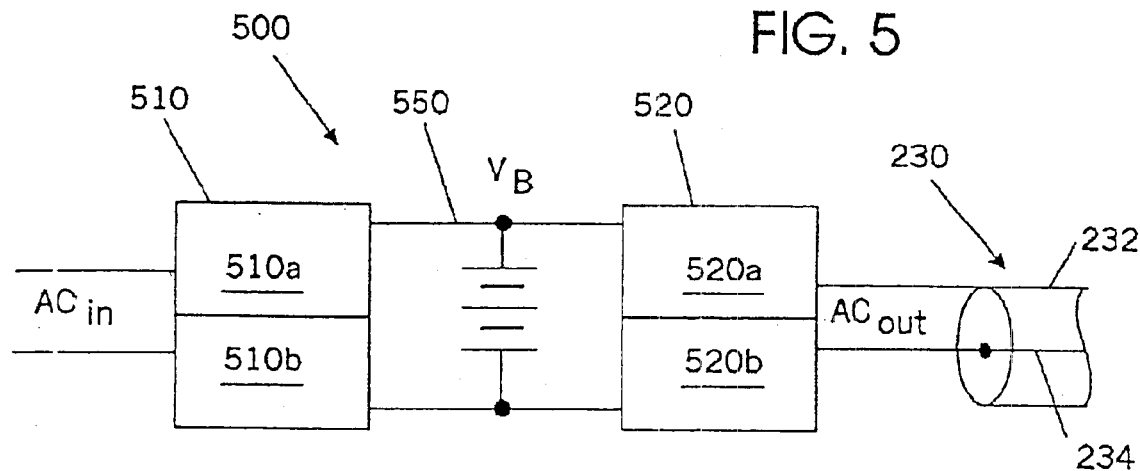

FIG. 5 is a block diagram of other UPS systems and methods for communications signal distribution systems, according to embodiments of the invention. As shown in FIG. 5, these UPS systems and methods 500 include a first circuit 510 that is responsive to an AC input voltage $AC_{in}$ and is configured to convert the AC input voltage into a DC voltage. A battery 550 produces a battery voltage $V_B$, and is configured to be charged by the DC voltage that is produced by the first circuit 510. A second circuit 520 is responsive to the battery voltage VB and is configured to convert the battery voltage $V_B$ into an AC voltage $AC_{out}$ and to place the AC voltage $AC_{out}$ on a coaxial cable 230 regardless of whether the AC input voltage $AC_{in}$ is operational. Accordingly, an on-line UPS for CATV systems is thereby provided.

In some embodiments of FIG. 5, the first circuit 510 may include a rectifier such as a buck rectifier. In other embodiments, the second circuit 520 may comprise a converter that is responsive to the battery voltage and is configured to convert the battery voltage $V_B$ to a second DC voltage that is different from the battery voltage $V_B$. The second circuit 520 also may comprise an inverter that is responsive to the second DC voltage and is configured to convert the second DC voltage into the AC voltage $AC_{out}$ and to place the AC voltage $AC_{out}$ on the coaxial cable 230. In other embodiments, the converter may be a boost converter, and the inverter may be a pulse width modulation inverter. Moreover, in yet other embodiments, the first circuit may comprise a first portion 510a and a second portion 510b that is a mirror image of the first portion. The second circuit also may comprise a first portion 520a and a second portion 520b that is a mirror image of the first portion. In other embodiments, the first and second circuits 510 and 520 also may be configured to connect an input neutral line to an output neutral line without an intervening transformer winding, to produce a trapezoidal AC output waveform and/or an AC output waveform that has a frequency that is greater than 60 Hz.

Figure 6:
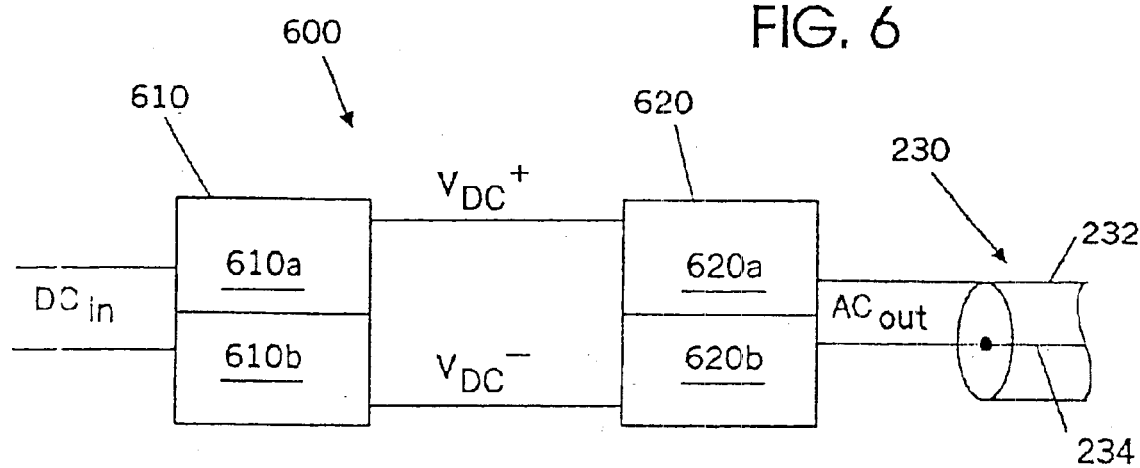

FIG. 6 is a block diagram of other UPS systems and methods for communications signal distribution systems according to embodiments of the invention. As shown in FIG. 6, these embodiments of UPS systems and methods 600 include a first circuit 610 that is responsive to a DC input voltage $DC_{in}$ and is configured to convert the DC input voltage $DC_{in}$ into first and second complementary DC voltages $V_{DC}^+$, $V_{DC}^-$. A second circuit 620 is responsive to the first and second complementary DC voltages $V_{DC}^+$, $V_{DC}^-$, and is configured to convert the first and second complementary DC voltages into an AC voltage $AC_{out}$ and to place the AC voltage on a coaxial cable 230.

In some embodiments, the first circuit 610 may comprise a polarity shifter. The second circuit 620 may comprise a converter that is responsive to the first and second complementary DC voltages $V_{DC}^+$, $V_{DC}^-$ and is configured to convert the first and second complementary voltages into third and fourth complementary DC voltages. The second circuit 620 also may comprise an inverter that is responsive to the third and fourth complementary DC voltages and is configured to convert the third and fourth complementary DC voltages into the AC voltage $AC_{out}$ and to place the AC voltage on the coaxial cable 230. In other embodiments, the converter may be boost converter and the inverter may be a pulse width modulation inverter.

Moreover, in other embodiments, the first circuit 610 may include a first portion 610a and a second portion 610b that is a mirror image of the first portion. The second circuit 620 also may include a first portion 620a and a second portion 620b that is a mirror image of the first portion. In other embodiments, the first and second circuits 610 and 620 may connect the input neutral line to the output neutral line without an intervening transformer winding, as was described above. In other embodiments, the second circuit 620 may produce a trapezoidal waveform and/or an AC frequency that is greater than 60 Hz, as was described above.

Figure 7:
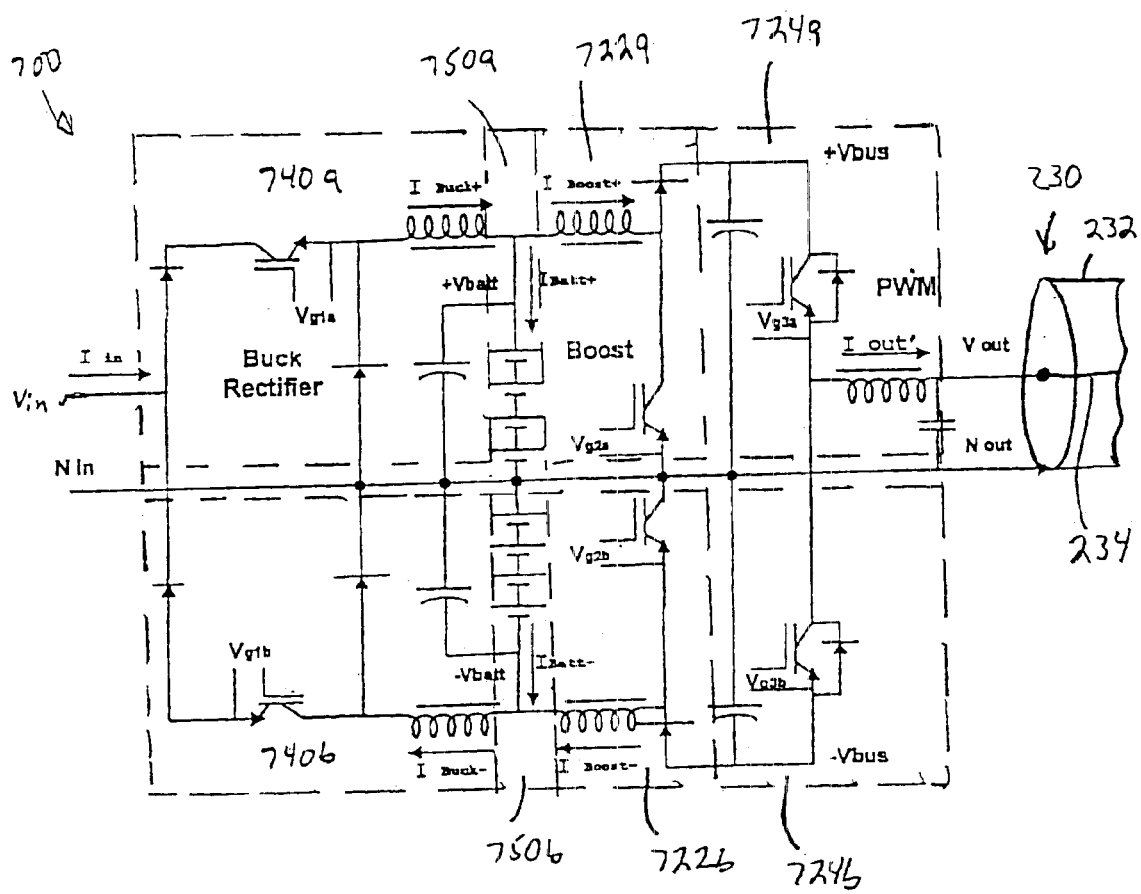
FIGS. 7–9 are schematic diagrams of UPS systems and methods according to embodiments of the invention.

Referring now to FIG. 7, a schematic diagram of UPS systems and methods 700 according to embodiments of the invention is shown. This schematic diagram may correspond to embodiments of a block diagram according to FIG. 3.

Referring again to FIG. 7, mirror image buck rectifiers 740a and 740b convert an AC input voltage, such as a 120V/230V line-to-neutral input voltage between AC input voltage line $V_{in}$ and neutral line $N_{in}$, into first and second complementary DC voltages $+V_{batt}$, $-V_{batt}$. The design and operation of buck rectifiers are well known to those having skill in the art and need not be described further herein.

Still referring to FIG. 7, a battery includes a neutral terminal and positive and negative battery portions 750a and 750b respectively. Mirror image boost converters 722a, 722b operate as a DC-to-DC converter to convert the battery voltages $+V_{batt}$, $-V_{batt}$ to DC bus voltages $+V_{bus}$, $-V_{bus}$. The design and operation of boost converters are well known to those having skill in the art and need not be described in further detail herein.

Still referring to FIG. 7, mirror image pulse width modulation inverters 724a, 724b are responsive to the converted DC bus voltages $+V_{bus}$, $-V_{bus}$, to produce an AC voltage between an output neutral line $N_{out}$ and an output voltage line $V_{out}$. The design and operation of pulse width modulation inverters are well known to those having skill in the art and need not be described in further detail herein. The other quantities that are labeled in FIG. 7 will be described in connection with FIG. 10 below.

Figure 8:
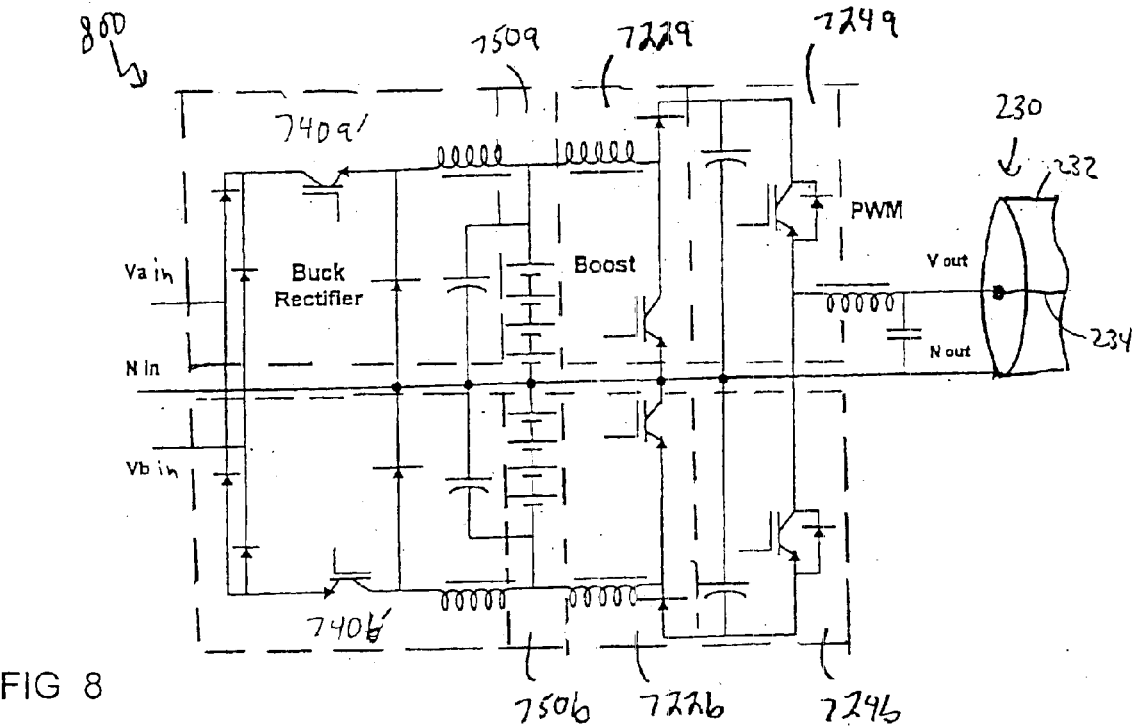

FIG. 8 is a schematic diagram of other UPS systems and methods 800 according to embodiments of the invention. FIG. 8 may be similar to FIG. 7, except that the AC input can be a 120V/240V line-neutral-line universal input, or a 120V/240V split-phase input. In these embodiments, the buck rectifier 740a', 740b' includes a full-wave rectifier input stage comprising four diodes. Otherwise, the elements and operations of FIG. 8 may be similar to those described in FIG. 7 and need not be described again. It will also be understood that the buck rectifier 740a', 740b' may also be configured and/or sized to run on a remaining line in the event power is lost on one line, to thereby provide redundancy.

Figure 9:
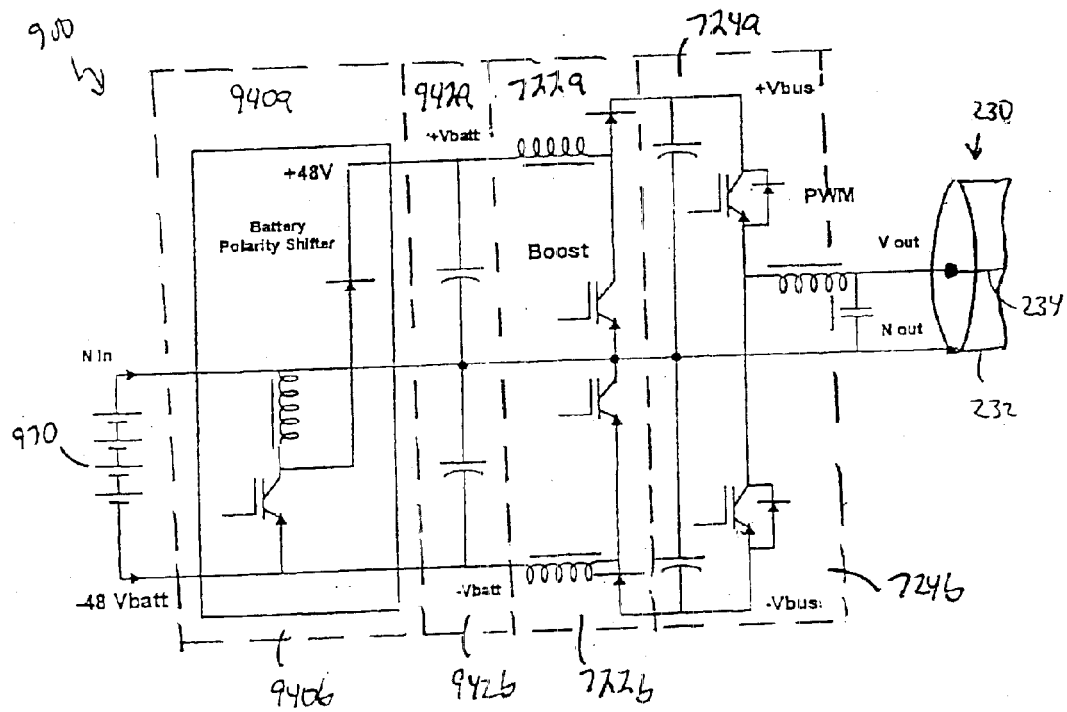

FIG. 9 is a schematic diagram of other UPS systems and methods 900 according to embodiments of the invention. This schematic diagram may correspond to embodiments of a block diagram according to FIG. 4, wherein a DC input, such as a −48V DC input 970 from a telecommunications plant is used. In FIG. 9, a battery polarity shifter 940a is used to produce the first and second complementary DC voltages $+V_{batt}$, $-V_{batt}$. Mirror image capacitors 942a, 942b also are used. It also will be understood that an internal battery, similar to internal batteries 750a and 750b of FIGS. 7 and 8 also may be provided, between $+V_{batt}$ and $-V_{batt}$, to provide an online UPS. Mirror image boost converters 722a, 722b and pulse width modulation inverters 724a and 724b also are provided.

Figure 10:
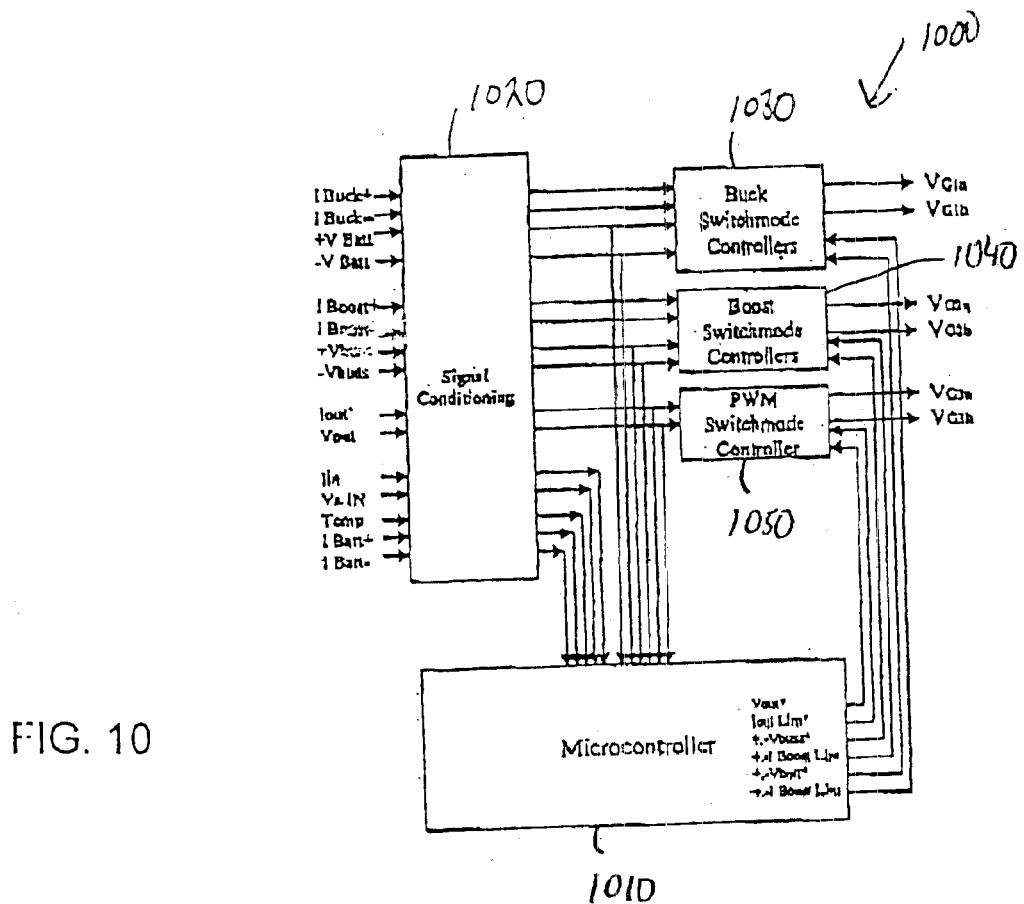
FIG. 10 is a block diagram of control systems and methods that may be used to control UPS systems and methods according to embodiments of the invention.

FIG. 10 is a block diagram of control systems and methods that may used to control UPS systems and methods according to embodiments of the invention. The systems and methods 1000 can include a microcontroller 1010, a signal conditioner 1020, buck switch mode controllers 1030, boost switch mode controllers 1040 and a pulse width modulation switch mode controller 1050. The voltages, currents and other quantities that are shown in FIG. 10 refer to the designations in FIG. 7. Similar controllers may be provided for other embodiments of the invention that are described in FIGS. 2–6 and 8–9. The design and operation of the individual blocks of FIG. 10 are well known to those having skill in the art and need not be described in detail herein.

The battery voltage may be controlled within constraining limits that are set for $I_{in}$, $I_{Batt}$ and $I_{Buck}$. The DC bus voltage may be controlled within constraining limits for $I_{Boost}$. The pulse width modulated inverter may be controlled to provide the desired output ($V_{out}$) within the constraining limits set for $I_{out}$. Desired parameters may be sensed and conditioned, as shown in FIG. 10, as inputs to the signal conditioning Block 1020. Many of the parameters may be sent to the microcontroller 1010. Constraining levels or limits may be set in the microcontroller 1010 that are appropriate for the desired system performance and/or component protection requirements. These may be hard coded, factory configured and/or user configured, as appropriate.

The functional converter stage control often is performed with dedicated control integrated circuits, as shown in blocks 1030, 1040 and 1050. These functions also may be incorporated into the microcontroller 1010, for example, in order to reduce cost. The gate drive interface that is presently included in the dedicated controllers 1030, 1040 and 1050 may remain external to the microcontroller 1010.

Figure 11:
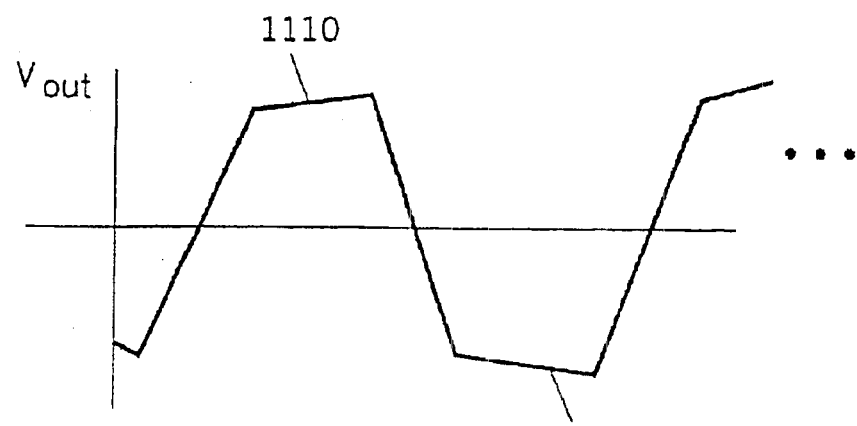
FIG. 11 graphically illustrates output waveforms that may be produced by UPS systems and methods according to embodiments of the invention.

Referring now to FIG. 11, control systems and methods of FIG. 10, and other control systems and methods, may be used to produce AC output voltages $V_{out}$ that have a trapezoidal waveform. As will be described below, trapezoidal waveforms may be well suited to provide AC power to CATV amplifiers. Trapezoidal waveforms may have slower rise time than a square wave, for example, a rise time of less than about 100V/Msec, to thereby allow reduced electromagnetic interference (EMI) to be produced, compared to a square wave. As also shown in FIG. 11, the trapezoidal waveform preferably does not have flat tops and bottoms, but rather has tops and bottoms 1110, 1120 that increase in magnitude or absolute value over time. Control systems and methods of FIG. 10 may be designed and operated to produce waveforms of FIG. 11, using techniques that are well known to those having skill in the art.

As also will be described below, in embodiments of the invention, the frequency of the trapezoidal waveform preferably is greater than 60 Hz for a 50/60 Hz AC input or for a DC input. In some embodiments, a frequency of 100 Hz or 120 Hz may be provided. By providing a higher frequency output waveform, the effect of sheath voltages can be reduced, as will be described in detail below.

Figure 12:
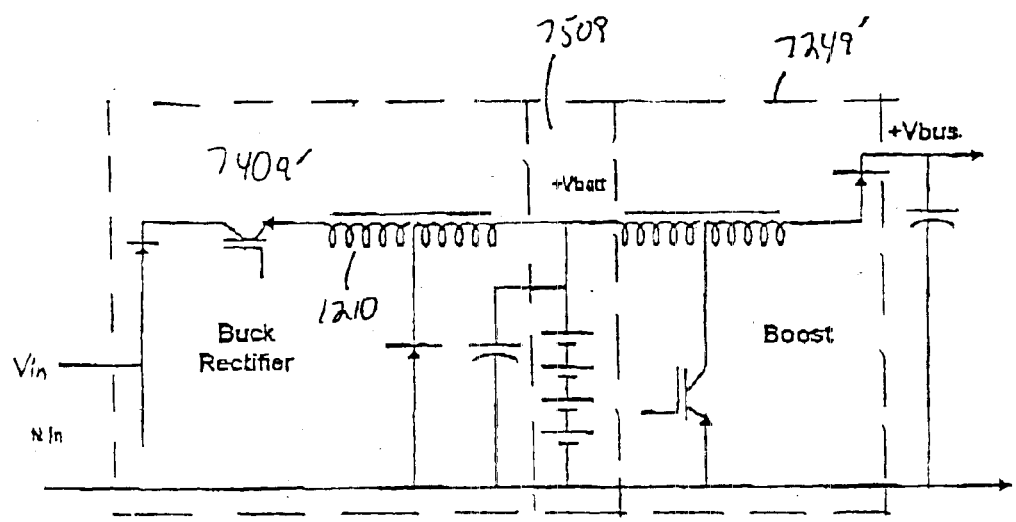
FIG. 12 is a schematic diagram of other UPS systems and methods according to embodiments of the invention.

Referring now to FIG. 12, a schematic diagram of other UPS systems and methods, according to embodiments of the invention, are shown. For simplicity, only the top half of the UPS is shown. As shown in FIG. 12, tapped inductors 1210, 1220 may be used in a buck rectifier 740a' and in a boost converter 724a', respectively, to improve and preferably optimize conversion ratios and/or component stress. Embodiments of FIG. 12 may otherwise be similar to embodiments of FIG. 7, and need not be described again.

Potential advantages of UPS systems and methods according to embodiments of the invention now will be described. It will be understood, however, that not all embodiments may possess all of the advantages that now will be described, and that the scope of the invention is set forth in the claims.

Embodiments of the invention can provide universal input acceptance, for example voltages of 120V line-to-neutral, 120/240V line/neutral/line, 230V line-to-neutral, −48V DC and/or other DC or AC voltages. The AC voltages may have a wide range of frequencies. Extended input voltage range also may be provided, for example +/−50%. At low line voltages, only the input current may be limited, and high line voltages of, for example, up to +50% continuous may be accommodated. Little or no inrush current may be generated, which can render embodiments of the invention circuit breaker- and generator-friendly. Moreover, generators with a wide frequency range may be used, for example frequencies between 40 and 80 Hz, without the need for phase lock. Near-unity input power factor may be provided and input waveform distortion may be tolerated. Enhanced surge suppression and protection also may be provided because the input neutral line is connected to the output neutral line without an intervening transformer winding. Finally, a seamless output may be provided by providing an on-line UPS with little or no transfer time. Line loss detection may not need to be provided.

Also, smaller size and/or lighter weight may be provided because a ferroresonant transformer may not need to be used. Moreover, future cost reductions may be provided because the material cost (copper and iron) may be reduced.

Universal and/or configurable outputs may be provided with various voltages and waveforms that can be sine, pseudosine, trapezoid and/or other waveforms. The output may be configured to maximize power plant utilization. For example, by providing an output waveform, such as a trapezoid as was described in FIG. 11, the output can increase and preferably maximize load utilization in terms of power factor and efficiency. Reduced conduction losses may be produced in the coaxial cable, and reduced peak stress may be obtained. Finally, output characteristics may be shaped to reduce and preferably eliminate interference from sheath current voltages. Thus, operation can be made less susceptible or immune to voltage drops due to sheath currents that are induced by poor grounding and/or neutral current flowing through coaxial cable sheath, as will be described in detail below.

By providing sharing of power between the battery and the input power during on-line and discharge periods, reduced battery battering may be provided. Enhanced low-line/brown-out performance and/or enhanced overload capacity also may be provided. Moreover, by providing power sharing during recharge, the available recharge power may be increased and preferably maximized under various load conditions. By allowing seamless transfer of power between the input voltage and the battery, output perturbations and discontinuities may be reduced and preferably may be eliminated. Moreover, by providing inherent surge suppression and survival capability, output perturbations and discontinuities due to input surges/spikes may be reduced. Mid-range efficiency also may be increased to provide efficiency peaks in the mid-power range, to match typical profiles and dynamics of present loads and anticipated future loads.

Embodiments of the invention also can allow the input, battery and output power to be cooperatively managed, to improve and preferably maximize system performance and capability. Maximum input power, within the constraints of input current limits, may be made available to support the load and/or recharge the battery. For example, if the line is interrupted for five milliseconds, then battery power may be used for only five milliseconds. The rectifier can supply power as soon as the line returns. This may allow a reduction of a thousand times compared to the traditional five seconds or more that present CATV supplies may draw power from the battery after the line returns.

Moreover, during brown-out/sag conditions, the rectifier can process as much input power as possible within the constraints of input current limits. This also can reduce and preferably minimize battery discharge. Thus, for example, for a 1000W load wherein the input voltage sags to 70% of nominal and the rectifier can only process 90% of load power without exceeding input current limits, then the battery can supply the 10% power deficit. Battery discharge thus can be only 10% for the duration of the sag. Available backup time therefore may be increased by, for example, ten times, for such a sustained low line condition. Short-term overloads such as 150% also may be supported by an additional contribution of the battery, should the line be low and the rectifier reach an input current limit. Thus, short-term overloads, such as a startup plant inrush, may be supplied rather than tripping an input circuit breaker or failing to support the short-term overload. Moreover, after an outage, the rectifier can make full input power available to both support the load and recharge the battery with the remaining available power. For wide range dynamic loads that may spend significant time at low demand levels, recharge times can be substantially reduced without the need to compromise component stress, equipment costs and/or input protection.

Battered battery syndrome also can be reduced significantly. In particular, in situations where there are frequent but very short power interruptions, the cumulative battery discharge can be reduced by up to, for example, a thousand times. This can greatly reduce the need to periodically top-up or equalize the battery, which can be a large contributing factor to battery life reduction, especially at elevated temperatures. Similar benefits may be obtained in locations that are subject to frequent voltage sags. The rectifier can produce as much input power as possible, again reducing the battered battery syndrome.

Additional discussion now will be provided regarding how embodiments of the invention may reduce and preferably cancel the harmful effects of sheath current drops (voltages) in the coaxial cable in certain installations where utility-neutral currents run through the coaxial cable sheath. In particular, when on utility power, the output voltage of conventional UPS systems and methods, such as those illustrated in FIG. 8, may be added to the drop in the cable sheath, which may cause the resultant voltage available to the load to be increased or decreased depending on the phase of the sheath currents. This may greatly compromise the regulation of apparent output voltage.

Moreover, when on battery or inverter power, the frequency of the inverter generally may not exactly equal that of the utility and a beat frequency can result at the apparent output voltage, with the sheath drop amplitude adding and subtracting to the nominal inverter output voltage at the beat frequency. Conventionally, an inverter frequency was designed to be very close to the utility frequency, so as to be compatible with the ferroresonant transformer. The beat frequency therefore may be very low, on the order of less than 1 Hz. The resultant input current to the typical CATV power-pack supply may increase and the internal DC bus voltage in the power supply may have greatly increased ripple.

Figure 13:
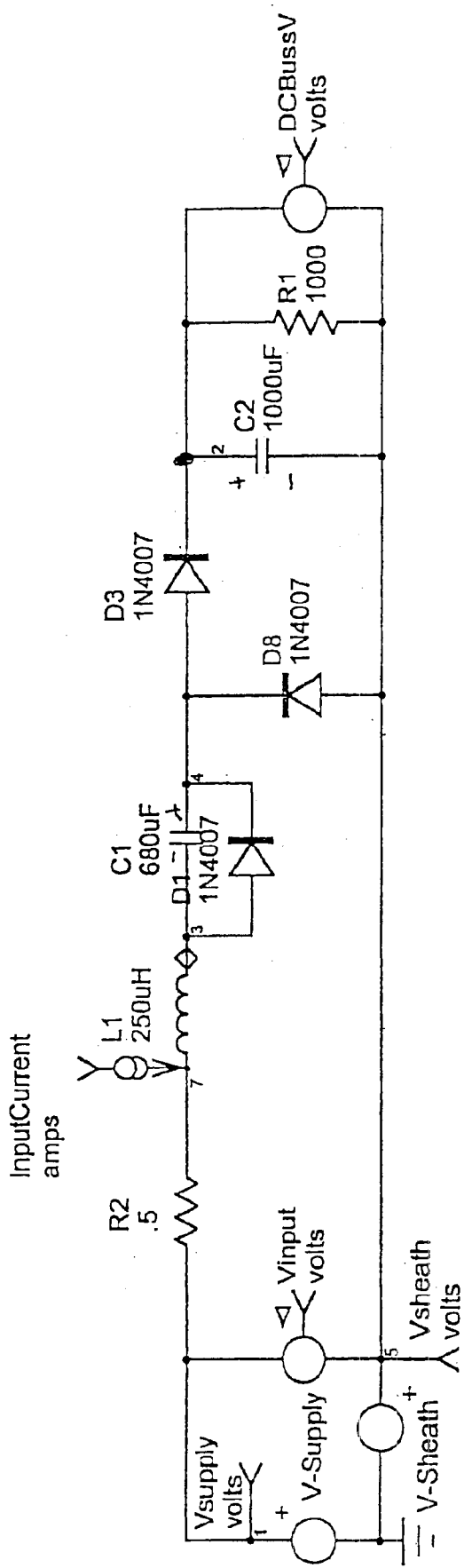
FIG. 13 is a schematic diagram that may be used to analyze and simulate the effect of sheath current drops on UPS systems and methods.
Figure 14:
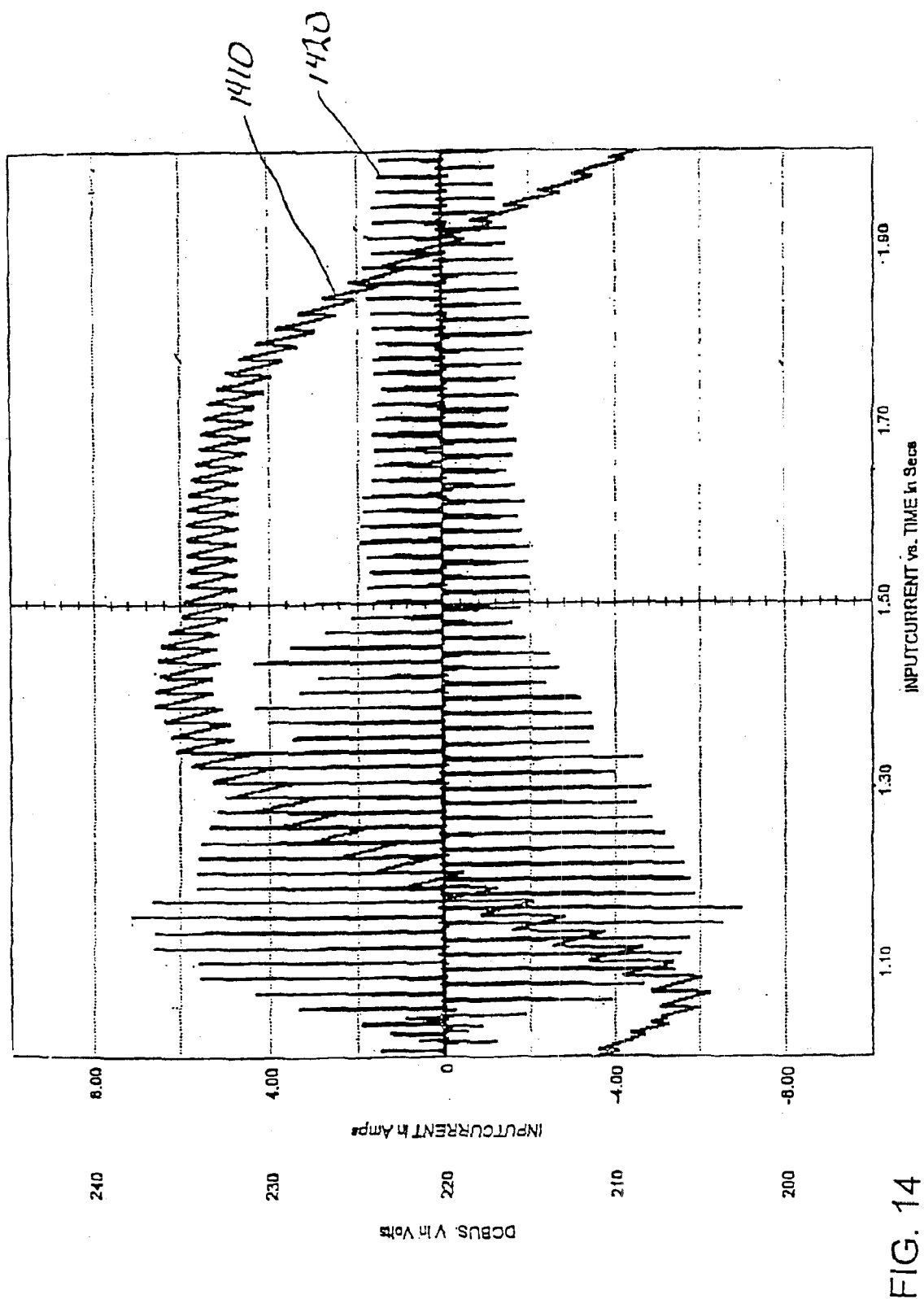
FIG. 14 graphically illustrates results of a simulation of an effect of sheath current drops on a conventional ferroresonant transformer-based UPS, such as illustrated in FIG. 1.

FIG. 13 is a schematic diagram that was used to simulate the effect of sheath current drops. FIG. 14 graphically illustrates the results of such a simulation, on a conventional ferroresonant transformer based UPS, such as illustrated in FIG. 1. The DC bus voltage is indicated by waveform 1410 and the input current is indicated by waveform 1420. For FIG. 14, the output voltage is a +/−110V, 59 Hz trapezoid and the input current is 1.01A rms. The sheath voltage is 10V peak (7.07V rms) at 60 Hz, causing a 1 Hz beat frequency.

Figure 15:
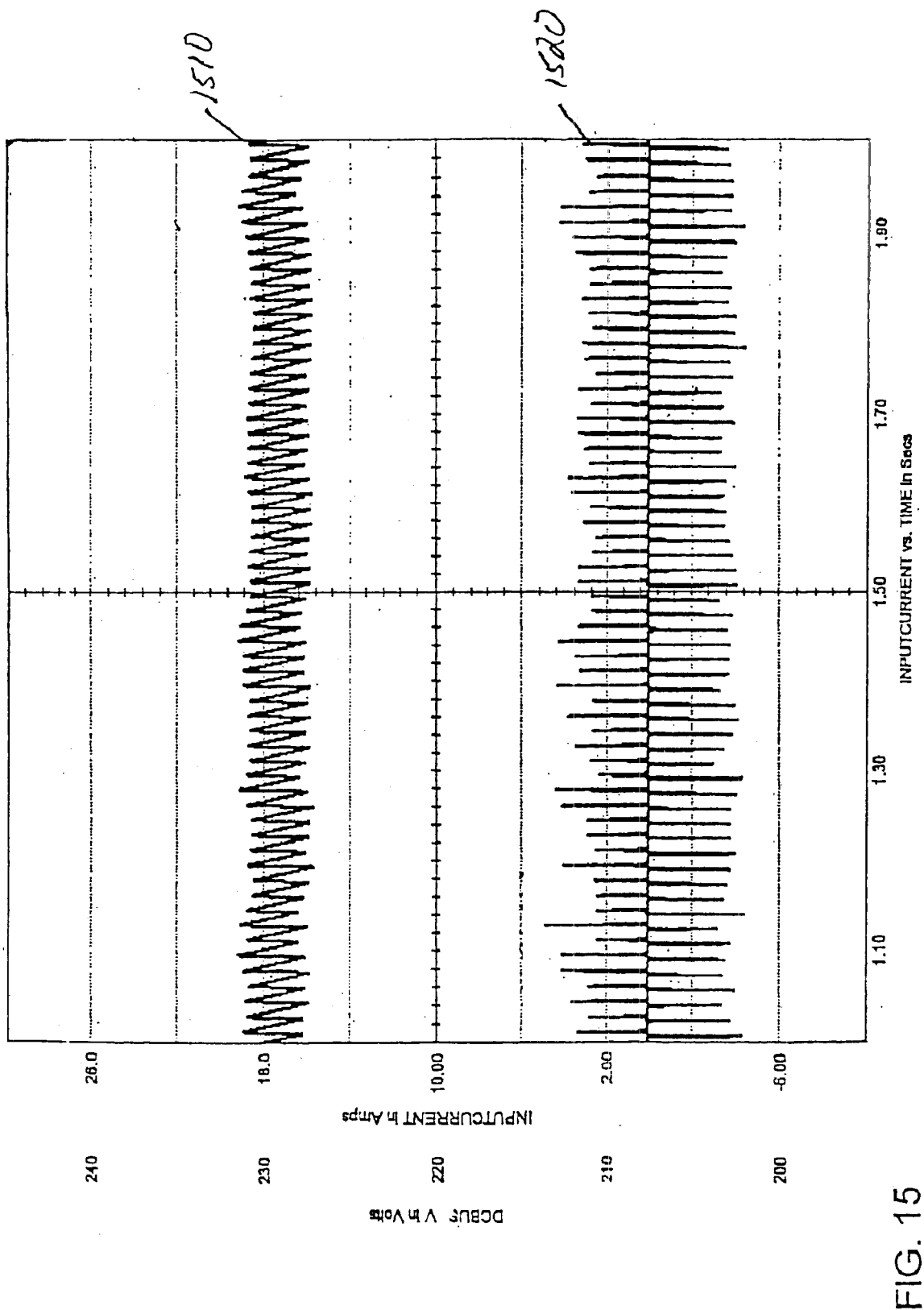
FIG. 15 graphically illustrates results of a simulation of an effect of sheath current drops on UPS systems and methods according to embodiments of the invention.

In sharp contrast, as shown in FIG. 15, embodiments of the invention can produce significantly less ripple on the DC bus and significantly less input current (both rms and peak). As shown in FIG. 15, for a UPS that is configured to provide +/−110V (88V rms), trapezoidal 120 Hz output, and a sheath voltage that is a 10V peak sine wave at 60 Hz, the input current variation 1510 and the supply voltage variation 1520 both can be reduced significantly. This can reduce stress on components and can increase the available apparent voltage. Accordingly, the ability to configure an output frequency different and preferably higher than the utility input frequency can reduce and preferably negate detrimental effects of sheath currents. Since sheath currents are a site phenomena and generally beyond the control of the UPS, this can provide a great advantage.

Embodiments of the invention can be partitioned into an input stage, for example including a buck rectifier and both battery bus capacitors, and an output stage, for example including boost and pulse width modulated converters. The battery can be offboard. Multiple parallel input stages can be incorporated for capacity and/or redundancy. These input stages may be designed for "hot plug" operation, thereby facilitating no-break service. Multiple output stages also may be provided to provide multiple, independently protected outputs. Thus, faults on one output need not compromise the other outputs. For example, two 15A rms output stages may be used to support a combined total maximum output of 25A rms. With the output waveform configured in a trapezoidal shape, the complementary DC voltages may be set at the desired peak output voltage and parallel output operation may be facilitated by controlling the sharing of DC current into the complementary DC buses. This can be simpler than full parallel control at the AC output node.

Figure 16:
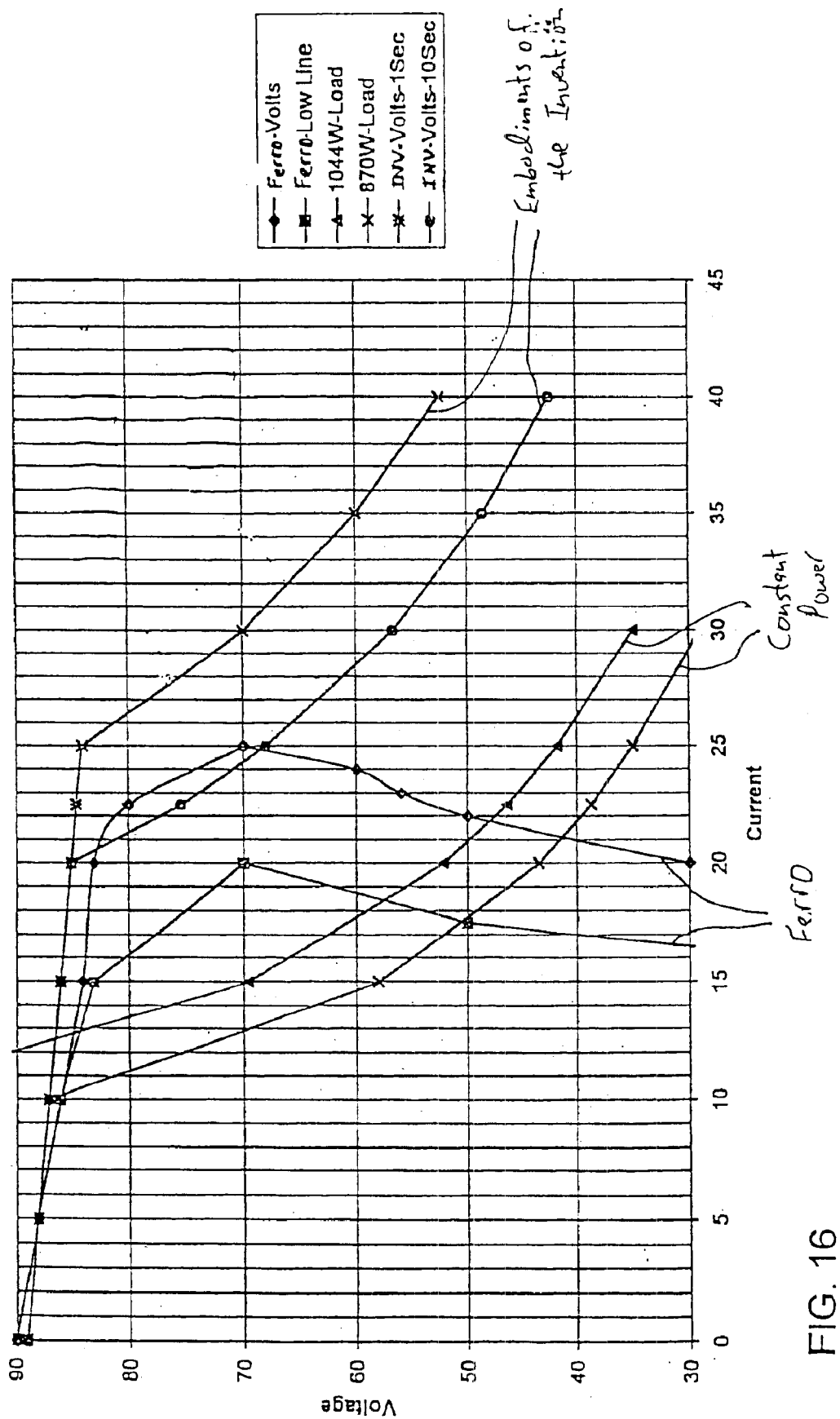
FIG. 16 graphically illustrates a simulated comparison of constant power curves of a conventional UPS and UPS systems and methods according to embodiments of the invention.

Finally, FIG. 16 graphically illustrates a simulated comparison of constant power curves for 1044W and 870W loads, compared to output power curves of conventional UPSs that use ferroelectric transformers (indicated as "Ferro") and UPS systems and methods according to embodiments of the invention (indicated as INV). As shown, embodiments of the invention can accommodate loads over a wide range of voltages and currents, especially constant power loads at less than about 70V.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An Uninterruptible Power Supply (UPS) for a communications signal distribution system that distributes a communications signal and Alternating Current (AC) power over a coaxial cable having a conductor and a sheath, the UPS comprising:
   an input neutral line;
   an input voltage line;
   a first circuit that is configured to convert an input voltage between the input neutral line and the input voltage line into first and second complementary Direct Current (DC) voltages, wherein
   the input voltage is an AC input voltage between the input neutral line and the input voltage line, and
   the first circuit comprises a battery and a third circuit that is configured to convert the AC input voltage between the input neutral line and the input voltage line into the first and second complementary DC voltage and to supply the first and second complementary DC voltage to the battery; and
   a second circuit that is configured to convert the first and second complementary DC voltages into an AC voltage between an output neutral line and an output voltage line and to connect the output neutral line to a coaxial cable sheath and the output voltage line to a coaxial cable conductor, the first and second circuits further being configured to connect the input neutral line to the output neutral line without an intervening transformer winding, wherein the second circuit comprises
   a DC-to-DC converter that is configured to convert the first and second complementary DC voltages into third and fourth complementary DC voltages; and
   an inverter that is responsive to the third and fourth complementary DC voltages and is configured to convert the third and fourth complementary DC voltages into the AC voltage between an output neutral line and an output voltage line.

2. A UPS according to claim 1 wherein the first circuit comprises a battery polarity shifter.

3. A UPS according to claim 1 wherein the third circuit comprises a rectifier.

4. A UPS according to claim 3 wherein the rectifier is a buck rectifier.

5. A UPS according to claim 1 wherein the third circuit comprises a first portion that is connected between the input neutral line and the first complementary DC voltage and a second portion that is a mirror image of the first portion and that is connected between the input neutral line and the second complementary DC voltage.

6. A UPS according to claim 1 wherein the second circuit comprises a first portion that is connected between the output neutral line and the first complementary DC voltage and a second portion that is a mirror image of the first portion and that is connected between the output neutral line and the second complementary DC voltage.

7. A UPS according to claim 1:
   wherein the second circuit is configured to convert the first and second complementary DC voltages from the battery into an AC voltage having an AC frequency that is greater than 60 Hz, between the output neutral line and the output voltage line.

8. A UPS according to claim 1 wherein the DC-to-DC converter is a boost converter.

9. A UPS according to claim 8 wherein the inverter is a pulse width modulation inverter.

10. A UPS according to claim 1 wherein the DC-to-DC converter is a boost converter.

11. A UPS according to claim 1 wherein the inverter is a pulse width modulation inverter.

12. A UPS according to claim 1 wherein the first circuit comprises a first portion that is connected between the input neutral line and the first complementary DC voltage and a second portion that is a mirror image of the first portion and that is connected between the input neutral line and the second complementary DC voltage.

13. A UPS according to claim 1 wherein the second circuit comprises a first portion that is connected between the output neutral line and the first complementary DC voltage and a second portion that is a mirror image of the first portion and that is connected between the output neutral line and the second complementary DC voltage.

14. A UPS according to claim 1:
   wherein the second circuit is configured to convert the first and second complementary DC voltages from the battery into the AC voltage between an output neutral line and an output voltage line regardless of whether the AC input voltage is operational.

15. A UPS according to claim 1:
   wherein the second circuit is configured to convert the first and second complementary DC voltages from the battery into an AC voltage having a trapezoidal waveform, between the output neutral line and the output voltage line.

16. A UPS according to claim 15:
   wherein the second circuit is further configured to convert the first and second complementary DC voltages from the battery into an AC voltage having an AC frequency that is greater than 60 Hz, between an output neutral line and an output voltage line.

17. An Uninterruptible Power Supply (UPS) for a communications signal distribution system that distributes a communications signal and Alternating Current (AC) power over a coaxial cable, the UPS comprising:
   a first circuit that is responsive to a Direct Current (DC) input voltage and is configured to convert the DC input voltage into first and second complementary DC voltages; and a second circuit that is responsive to the first and second complementary DC voltages and is configured to convert the first and second complementary DC voltages into an output AC voltage and to place the output AC voltage on a coaxial cable, wherein the second circuit comprises a converter that is responsive to the first and second complementary DC voltages and is configured to convert the first and second complementary DC voltages into third and fourth complementary DC voltages; and an inverter that is responsive to the third and fourth complementary DC voltages and is configured to convert the third and fourth complementary DC voltages into the output AC voltage and to place the output AC voltage on a coaxial cable.

18. A UPS according to claim 17 wherein the first circuit comprises a polarity shifter.

19. A UPS according to claim 17 wherein the converter is a boost converter.

20. A UPS according to claim 17 wherein the inverter is a pulse width modulation inverter.

21. A UPS according to claim 17 wherein the first circuit comprises a first portion and a second portion that is a mirror image of the first portion.

22. A UPS according to claim 17 wherein the second circuit comprises a first portion and a second portion that is a mirror image of the first portion.

23. A UPS according to claim 17:

wherein the first circuit is responsive to a DC input voltage between an input neutral line and an input voltage line and is configured to convert the DC input voltage into first and second complementary DC voltages; and wherein the second circuit is configured to convert the first and second complementary DC voltages to an output AC voltage between an output neutral line and an output voltage line and to connect the output neutral line and the output voltage line to the coaxial cable, the first and second circuits further being configured to connect the input neutral line to the output neutral line without an intervening transformer winding.

24. A UPS according to claim 17 wherein the second circuit is configured to convert the first and second complementary DC voltages to an output AC voltage having a trapezoidal waveform and to place the output AC voltage having a trapezoidal waveform on a coaxial cable.

25. A UPS according to claim 24 wherein the output AC voltage having a trapezoidal waveform has an AC frequency that is greater than 60 Hz.

26. A UPS according to claim 17 wherein the output AC voltage has an AC frequency that is greater than 60 Hz.

27. A method for supplying power to a communications signal distribution system that distributes a communications signal and Alternating Current (AC) power over a coaxial cable having a conductor and a sheath, the method comprising:

converting an input voltage between an input neutral line and an input voltage line into first and second complementary Direct Current (DC) voltages, wherein the input voltage is an AC input voltage between the input neutral line and the input voltage line;

converting the first and second complementary DC voltages into an output AC voltage between an output neutral line and an output voltage line while connecting the input neutral line to the output neutral line without an intervening transformer winding; and connecting the output neutral line to a coaxial cable sheath and the output voltage line to a coaxial cable conductor;

wherein the step of converting an input voltage comprises converting the AC input voltage between the input neutral line and the input voltage line into the first and second complementary DC voltages, and supplying the first and second complementary DC voltages to a battery;

wherein the step of converting the first and second complementary DC voltages comprises converting the first and second complementary DC voltages from the battery into the output AC voltage between an output neutral line and an output voltage line;

wherein the step of converting the first and second complementary DC voltages comprises converting the first and second complementary DC voltages into third and fourth complementary DC voltages; and converting the third and fourth complementary DC voltages into the output AC voltage between an output neutral line and an output voltage line.

28. A method according to claim 27:

wherein the input voltage is a DC input voltage between the input neutral line and the input voltage line; and wherein the step of converting an input voltage comprises converting the DC input voltage between the input neutral line and the input voltage line into the first and second complementary DC voltages.

29. A method according to claim 27:

wherein the step of converting the first and second complementary DC voltages comprises converting the first and second complementary DC voltages from the battery into the output AC voltage between an output neutral line and an output voltage line regardless of whether the AC input voltage is operational.

30. A method according to claim 27:

wherein the step of converting the first and second complementary DC voltages comprises converting the first and second complementary DC voltages from the battery into an output AC voltage having a trapezoidal waveform, between the output neutral line and the output voltage line.

31. A method according to claim 30:

wherein the step of converting the first and second complementary DC voltages further comprises converting the first and second complementary DC voltages from the battery into an output AC voltage having an AC frequency that is greater than 60 Hz, between an output neutral line and an output voltage line.

32. A method according to claim 27:

wherein the step of converting the first and second complementary DC voltages comprises converting the first and second complementary DC voltages from the battery into an output AC voltage having an AC frequency that is greater than 60 Hz, between the output neutral line and the output voltage line.

33. An Uninterruptible Power Supply (UPS) for a communications signal distribution system that distributes a communications signal and Alternating Current (AC) power over a coaxial cable having a conductor and a sheath, the UPS comprising:

an input neutral line;

an input voltage line;

a first circuit that is configured to convert an input voltage between the input neutral line and the input voltage line into first and second complementary Direct Current (DC) voltages; and a second circuit that is configured to convert the first and second complementary DC voltages into an output AC voltage between an output neutral line and an output voltage line and to connect the output neutral line to a coaxial cable sheath and the output voltage line to a coaxial cable conductor, the first and second circuits further being configured to connect the input neutral line to the output neutral line without an intervening transformer winding;

wherein the input voltage is a DC input voltage between the input neutral line and the input voltage line; and wherein the first circuit is configured to convert the DC input voltage between the input neutral line and the input voltage line into the first and second complementary DC voltages wherein the second circuit comprises a DC-to-DC converter that is configured to convert the first and second complementary DC voltages into third and fourth complementary DC voltages; and an inverter that is responsive to the third and fourth complementary DC voltages and is configured to convert the third and fourth complementary DC voltages into the output AC voltage between an output neutral line and an output voltage line.

34. A UPS according to claim 33 wherein the DC-to-DC converter is a boost converter.

35. A UPS according to claim 33 wherein the inverter is a pulse width modulation inverter.

36. A method for supplying power to a communications signal distribution system that distributes a communications signal and Alternating Current (AC) power over a coaxial cable having a conductor and a sheath, the method comprising:

converting an input voltage between an input neutral line and an input voltage line into first and second complementary Direct Current (DC) voltages;

converting the first and second complementary DC voltages into an output AC voltage between an output neutral line and an output voltage line while connecting the input neutral line to the output neutral line without an intervening transformer winding; and connecting the output neutral line to a coaxial cable sheath and the output voltage line to a coaxial cable conductor wherein the input voltage is a DC input voltage between the input neutral line and the input voltage line; and wherein the step of converting an input voltage comprises converting the DC input voltage between the input neutral line and the input voltage line into the first and second complementary DC voltages;

wherein the step of converting the first and second complementary DC voltages comprises converting the first and second complementary DC voltages into third and fourth complementary DC voltages; and converting the third and fourth complementary DC voltages into the output AC voltage between an output neutral line and an output voltage line.

* * * * *